United States Patent Office 3,451,987
Patented June 24, 1969

3,451,987
PROCESS AND CATALYTIC COMPOSITIONS FOR OBTAINING AMORPHOUS 1,2-POLYBUTADIENE AND THE PRODUCTS THEREOF
François Dawans, Bougival, and Philippe Teyssie, Le Vesinet, France, assignors to Institut Francais du Petrole des Carburants et Lubrifiants, Rueil-Malmaison, Hauts-de-Seine, France
No Drawing. Filed Sept. 23, 1966, Ser. No. 581,451
Claims priority, application France, Sept. 24, 1965, 32,688
Int. Cl. C08f *3/18;* B01j *11/78*
U.S. Cl. 260—94.3                                   22 Claims

ABSTRACT OF THE DISCLOSURE

For the production of polybutadiene having higher than 98% 1,2-addition product, 1,3-butadiene is polymerized with a catalyst consisting essentially of:

(a) A molybdenum halide or oxyhalide, e.g. molybdenum pentahalide, and an aluminium compound having the formula $(RO)(R')_2Al$ wherein R and R' are monovalent hydrocarbon groups, e.g. monoethoxy-diethyl-aluminium and the molar ratio of the aluminum compound to the molybdenum compound is greater than about 0.9.

---

Applicants claim priority under 35 U.S.C. 119 for French application No. 32,688, filed Sept. 24, 1965.

The present invention relates generally to the polymerization of 1,3-butadiene and particularly to an improvement in the polymerization process and catalyst compositions for obtaining amorphous 1,2-polybutadiene and the products thereof.

According to the prior art as disclosed in Kirk & Othmer, "Encyclopedia of Chemical Technology," 2nd Edition (1964), vol. 3, pp. 784–815, particularly pp. 787–788 and the reference material cited therein, 1,3-butadiene is readily polymerized to structures corresponding to the cis-1,4, trans-1,4 and 1,2 addition of the monomer.

The 1,2-polybutadienes of the prior art are amorphous or crystalline products having an isotactic structure with a melting point of 120° C., and a syndiotactic modification with a melting point of 154° C. Most of the known polymerization processes for producing these compounds result in the production of amorphous or crystalline 1,2-polybutadiene mixtures from which the various fractions are separated advantageously as a result of their differences in solubility. The 1,2-polybutadienes obtained by selective solvent extraction frequently contain a certain amount of gel and are only partially soluble in the usual solvents. Finally, the molecular weights are usually quite low as indicated by low intrinsic viscosities.

The catalysts generally employed are of the Ziegler-Natta type systems and are obtained by reacting a metal-organic reducing compound of a metal of Group I, II and III of the Periodic Table with an oxygen, nitrogen or phosphorus compound of a transition metal of Group IV, V or VI of the Periodic Table. Other catalytic systems are obtained by adding amines, ethers, esters or phosphines to the classical Ziegler systems.

An amorphous, high molecular weight, 1,2-polybutadiene is particularly useful in the formulation of adhesive and in the preparation of films and coatings by the evaporation of solvents from solutions thereof.

It is, therefore, an object of the present invention to provide an improved process for obtaining an amorphous, high molecular weight, 1,2-polybutadiene.

Another object of the invention is a new catalyst composition for carrying out the polymerization of 1,3-butadiene to 1,2-polybutadiene.

Still another object of the invention is the polymerization of 1,3-butadiene to a polymer product having greater than 98% 1,2-addition.

Further objects of the invention are amorphous, high molecular weight 1,2-polybutadienes having a high solubility in organic solvents.

Upon further study of the specification and claims, other objects and advantages of the present invention will become apparent.

According to the present invention, a catalytic system obtained by the reaction of an aluminum compound of the formula $(RO)(R')_2Al$ with a halide or oxyhalide of molybdenum is used to prepare directly and with high reaction velocity amorphous polybutadiene containing more than 90% and usually more than 98% of 1,2-polybutadiene. The polymers thus prepared contain no gel and are completely soluble in the usual solvents such as, for example, benzene, toluene, chloroform and carbon disulfide.

High intrinsic viscosities, determined by the methods disclosed by P. J. Flory in "Principles of Polymer Chemistry" (1953), on pages 309–310, have been obtained for the addition products of the present invention having values higher than 4. The molecular weight corresponding to the intrinsic viscosity of 4, as disclosed on pages 310 and 311 of Flory, is around 400,000.

The 1,2-polybutadienes obtained by the present invention have an intrinsic viscosity of about 0.5 to 10, preferably 3 to 8 and more preferably about 4 to 6. The molecular weights corresponding to the broadest intrinsic viscosity range are about 50,000 to 1,000,000 wth the preferred range 150,000 to 500,000.

In the formula of the aluminum compound R and R' are monovalent hydrocarbon groups, especially alkyls, cycloalkyls, aryls, aralkyl or a combination of these groups, for example, alkaryl, aralkyl, cycloalkyl-alkyl or aryl-cycloalkyl radicals.

The R and R' groups contain about 1 to 20 carbon atoms, and preferably 1 to 4.

Examples of aluminum compounds are:

Methoxy-dimethyl        Propoxy-dimethyl
Methoxy-diethyl         Ethoxy-diisobutyl
Ethoxy-dimethyl         Isobutoxy-diisobutyl
Ethoxy-diethyl          Phenoxy-diisobutyl
Butoxy-diethyl          Phenoxy-diethyl The preferred aluminum compound is monoethoxy-diethyl aluminum.

Other useful aluminum compounds are:

Benzyloxy-dicyclohexyl
Cyclohexyloxy-methyl-ethyl
o.Tolyloxy-phenyl-methyl
Ethoxy-dibenzyl
Isobutoxy-di (p. tolyl)

Examples of the halides and oxyhalides of molybdenum, which in the presence of the aluminum derivative form a catalytic system for the polymerization of the butadiene, follow:

Molybdenum—
  Pentachloride        Oxytrichloride
  Tetrachloride        Oxytetrachloride
  Trichloride          Dioxy-dibromide
  Dichloride           Dioxy-dichloride
  Hexafluoride         Trioxy-pentachloride
  Tetrabromide         Oxytetrafluoride
  Tribromide           Tetraiodide
  Dibromide The preferred compounds of molybdenum are the pentachloride, the oxytrichloride and the tetrachloride.

The great activity and the observed stereo-selectivity are specific to the catalytic couple that is used.

In fact, the polybutadienes prepared in the presence of a catalytic system comprising a molybdenum derivative such as $MoCl_5$, and a metal-organic derivative not corresponding to the formula $AlR_2OR'$, are mainly the 1,4-addition product.

It was, therefore, entirely unobvious to expect that it is possible to obtain essentially 1,2-polybutadienes by the catalytic combination of this invention.

Whereas this invention embraces the broad combination of molybdenum and aluminum compounds as previously indicated, the preferred specific combinations include:

| n° | Al compound | Mo compound |
|---|---|---|
| 1 | $(C_2H_5O)(C_2H_5)_2Al$ | $MoCl_5$ |
| 2 | $(C_2H_5O)(C_2H_5)_2Al$ | $MoCl_4$ |
| 3 | $(isoC_4H_9O)(CH_3)_2Al$ | $MoCl_3$ |
| 4 | $(C_6H_5O)(isoC_4H_9)_2Al$ | $MoBr_4$ |
| 5 | $(CH_3O)(C_2H_5)_2Al$ | $MoOF_4$ |
| 6 | $(C_6H_{11}O)(CHE_3)_2Al$ | $MoO_2Br_2$ |
| 7 | $(C_2H_5O)(C_6H_{11})_2Al$ | $MoCl_5$ |
| 8 | $(C_2H_5O)(C_2H_5)(CH_3)Al$ | $MoCl_5$ |

It has been further discovered that in the presence of the Al/Mo catalytic system of the present invention, the stereoregularity of 1,2-addition product is not obtained except for molar ratios of the aluminum compound to the molybdenum compound (Al/Mo) greater than about 0.9. In fact, for ratios less than 0.9, there is obtained not only a very low degree of conversion, but the polybutadiene produced has a microstructure that is essentially the 1,4-addition product.

The molar ratios (Al/Mo) above 0.9 comprise, for example, those between 0.9 and 20, preferably between 1.5 and 3. These ratios make it possible to obtain, with a high degree of conversion, polybutadienes comprising primarily the 1,2-addition product.

This important effect of the Al/Mo ratio on the 1,4- or 1,2-addition structure of the polymer comprises a very unusual phenomenon for catalysts useful in the polymerization of butadiene.

An essentially vinyl or 1,2-addition structure is favored by the use of molar ratios of the molybdenum halide to the butadiene above 0.001. The highest conversions and viscosities are obtained when the ratio is between 0.0015 and 0.0075.

The polymerizations are preferably performed in the usual inert solvents such as the aromatic or aliphatic hydrocarbons, or their mixtures. In a particular embodiment, the butadiene serves as the solvent.

The polymerization temperatures are generally between $-25$ and $+75°$ C., preferably between 30 and 60° C.

According to a particular embodiment of the present invention, a kind of catalysis is performed by reacting the constituents of the catalytic system in the presence of a minor proportion of butadiene, preferably from 1 to 20 moles of butadiene per mole of molybdenum halide. Under these conditions a polymerization catalyst is obtained having complete solubility in the hydrocarbon phase and facilitating the polymerization in a homogeneous phase. Such a process permits improved control of the molecular weight of the polymer and facilitates the final purification of the polymer product.

In particular it is possible by varying the operating conditions of the present invention to obtain the desired value of the molecular weight within a small frequency of variation. As a result of this improved molecular weight control, it is possible to reduce considerably the final fractionating operations previously required to obtain a polymer of definite molecular weight. According to the present invention, it is readily possible to obtain polymers of high molecular weight with higher yields than those obtained by previous methods.

The polymerizations are interrupted in the conventional manner, for example, by addition of an alcohol such as methanol which may also contain an antioxidant. The operation is preferably performed in the presence of a molybdenum complexing agent, as for example, the disodium salt of ethylene-diamine-tetracetic acid.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Examples 7 to 29 represent the contribution of the present invention, while Examples 1 to 6 represent the prior art, which are given for purposes of comparison.

Example 1

To 0.1 g. of $MoCl_5$, a solution of 3.9 g. 1,3-butadiene in 13 cm.$^3$ toluene is added at $-30°$ C. under an inert atmosphere. After agitating the mixture 20 hours at 55° C., there are no polymers obtained by precipitation of the reaction mixture in methyl alcohol.

Example 2

To a solution of 3.9 g. 1,3-butadiene in 13 cm.$^3$ toluene, 0.1 g. $MoCl_5$ and 5.7 cm.$^3$ of a solution of 11.4 g./liter of $(C_2H_4)_3Al$ in toluene are added at $-30°$ C. and under an inert atmosphere (which gives a molar ratio of 2 for the Al/Mo compounds). After agitating 5 hours at 55° C., the reaction is arrested by an addition of 20 cm.$^3$ methanol containing a conventional antioxidant, for example, β-phenylnaphthylamine. The resulting mixture is precipitated by addition to 120 cm.$^3$ acidified methanol containing the disodium salt of ethylene-diamine-tetracetic acid. 0.2 g. of a polymer composed mainly of 1,4-addition product is obtained which is insoluble in hydrocarbons.

Example 3

To a solution of 5.2 g. 1,3-butadiene in 18.5 cm.$^3$ toluene are added 2.4 cm.$^3$ of a solution of 13 g./liter of $(C_2H_5O)(C_2H_5)_2Al$ in toluene and 3.1 cm.$^3$ of a solution of 14.6 g./liter of $TiCl_4$ in cyclohexane at $-30°$ C. and under an inert atmosphere, giving a molar percentage of 0.25% for the ratio of the $TiCl_4$ to the butadiene, and a molar ratio of 1 for the Al/Ti compounds. After agitating 2 hours at 55° C., the polymerization is arrested as previously, whereupon 0.12 g. polybutadiene is obtained and the microstructure, as determined by the method of Ciampelli and coll. [La Chimica e l'Industria 41 758 (1959)], comprises 95% 1,4-trans and 5% 1,2-addition product.

Example 4

If under the same conditions as those of Example 3, the amount of the solution of $(C_2H_5O)(C_2H_5)_2Al$ in toluene is doubled so that a molar ratio of 2 for Al/Ti is maintained, there is obtained 0.85 g. of linear polybutadiene containing 82% of 1,4-cis and 18% 1,4-trans addition product.

Examples 5 to 13

To 0.1 g. $MoCl_5$ is added a solution of 3.9 g. 1,3-butadiene in 17 cm.$^3$ anhydrous toluene at $-30°$ C. under an inert atmosphere. Then the volume of solution having a concentration of 13 g./liter of $$(C_2H_5O)(C_2H_5)_2Al$$

in toluene is added so that the necessary molar ratio of the aluminum compound to the molybdenum compound is obtained.

The molar concentration of the $MoCl_5$ relative to the butadiene is equal to 0.5%.

The mixture is agitated 2 hours at 55° C. and the reaction is then interrupted by the addition of methyl alcohol containing a conventional antioxidant such as β-phenylnaphthylamine. The resulting mixture is then diluted to 7 times its volume with methanol acidified by hydrochloric acid and containing a molybdenum complexing agent such as the disodium salt of ethylene-diamine-tetracetic acid. The precipitate is separated by filtration, washed several times with methanol, and dried under vacuum. The polymer is purified by dissolution in benzene and reprecipitation in methanol. It is finally dried under vacuum.

The degree of conversion into polymer [100 (wt. of polymer)/(wt. of monomer)] is then noted (Table I), and also the microstructure of the polymer and the intrinsic viscosity at 30° C. in benzene.

Viscosimeters of the dilution type ASTM D 445 are used to determine the specific viscosity at 4 different concentrations. The intrinsic viscosity is then determined by extrapolation, in dl./g. (P. J. Flory, Principles of Polymer Chemistry, Cornell University Press, 1953, pages 309–310).

The results are listed in Table I.

The polymers of Examples 8 to 13, comprising the vinyl addition product, are white, elastomeric, free from traces of metal and are stable in air.

TABLE I

| Example | Molar ratio of Al/Mo compounds | Conversion, percent | Percent 1,4-trans | Percent vinyl | Intrinsic viscosity |
|---|---|---|---|---|---|
| 5 | 0.5 | 4 | 100 | 0 | |
| 6 | 0.7 | 9 | 83 | 17 | |
| 7 | 0.9 | 35 | 52 | 48 | |
| 8 | 1.1 | 82 | <2 | >98 | 1.75 |
| 9 | 1.4 | 85 | <2 | >98 | 1.85 |
| 10 | 1.7 | 86 | <2 | >98 | 2.02 |
| 11 | 2 | 86 | <2 | >98 | 2.08 |
| 12 | 5 | 78 | <2 | >98 | 1.70 |
| 13 | 8 | 51 | <2 | >98 | 1.55 |

Examples 14 to 18

The polymerization is conducted as in Examples 5 to 13, but with the amount of $MoCl_5$ lowered to 0.03 g. so as to obtain a molar concentration of $MoCl_5$ relative to the butadiene of 0.17%.

In all the examples the polymer obtained comprises more than 98% of vinyl and less than 2% of 1,4-trans addition product. The other results are indicated in Table II.

TABLE II

| Example | Molar ratio of Al/Mo compounds | Conversion, percent | Intrinsic viscosity |
|---|---|---|---|
| 14 | 0.94 | 38 | 3.00 |
| 15 | 1.02 | 41 | 3.05 |
| 16 | 1.45 | 59 | 4.35 |
| 17 | 1.80 | 64 | 3.80 |
| 18 | 2.00 | 65 | 3.80 |

Examples 19 to 25

The polymerization is conducted as in Example 11, but with the amount of $MoCl_5$ varied so as to obtain other molar ratios of $MoCl_5$ to butadiene.

The results obtained are listed in Table III:

TABLE III

| Example | Percent molar $MoCl_5/C_4H_6$ | Conversion, percent | Percent 1,4-trans | Percent vinyl | Intrinsic viscosity |
|---|---|---|---|---|---|
| 19 | 0.12 | 2.5 | 6.6 | 93.4 | |
| 20 | 0.17 | 65 | .5 | 95 | 3.80 |
| 21 | 0.30 | 81 | <2 | >98 | 2.57 |
| 22 | 0.50 | 86 | <2 | >98 | 2.08 |
| 23 | 0.75 | 92 | <2 | >98 | 1.50 |
| 24 | 1.00 | 58 | <2 | >98 | 1.20 |

Example 25

By repeating Example 11 at 40° C., a yield of 2.9 g. (74% conversion) of amorphous polybutadiene is obtained, containing more than 98% of 1,2-addition, and having an intrinsic viscosity of 1.25.

Example 26

To a suspension of 0.274 g. molybdenum pentachloride in 80 cm.³ toluene, 1.3 g. liquid butadiene and 20 cm.³ of a solution of 13 g. monoethoxy-diethylaluminum per liter of toluene are added at −10° C. The reaction mixture is agitated 2 hours at 40° C. under an inert atmosphere and then filtered.

To 50 cm.³ of the filtered solution, 3.9 g. butadiene are added. After 210 minutes of agitation at 40° C., 1.6 g. amorphous polybutadiene are obtained, consisting essentially of 1,2-addition and having an intrinsic viscosity of 8.5 in benzene at 30° C.

If the agitation at 40° C. is continued 16 hours, 3.1 g. 1,2-polybutadiene are obtained with an intrinsic viscosity of 7.8.

Example 27

To a suspension of 0.274 g. $MoCl_5$ in 34 cm.³ toluene, 10.4 g., liquid butadiene and 20 cm.³ of a solution of 13 g. monoethoxy-diethyl-aluminum per liter of toluene are added at −10° C. After 270 minutes of agitation at 40° C., 4 g. of amorphous vinyl polybutadiene are obtained.

Example 28

If in Example 27 the molybdenum pentachloride is replaced by 0.238 g. of molybdenum tetrachloride, everything else remaining the same, the yield is 2.2 g. of polybutadiene of a structure similar to that obtained in Example 27.

Example 29

Finally, if in Example 27 the molybdenum derivative is 0.218 g. of molybdenum oxytrichloride, everything else remaining the same, the yield is 7.5 g. 1,2-polybutadiene.

The structure and the crystallinity of the polymers obtained in the examples illustrating the process of this invention have been determined, for example, by their infrared spectra, by their X-ray diffraction, and by the study of their solubility in ethyl ether where the solubility indicates the absence of crystalline fraction. However, their complete solubility in the classical solvents such as benzene, toluene, chloroform and carbon disulfide, shows that these polymers of high molecular weight do not contain any gel.

The amorphous 1,2-polybutadienes prepared according to the methods of the present invention, are vulcanizable by the usual methods and present good mechanical and elastic properties, [400% elongation before rupture, a resistance of 180 kg./cm.² to rupture, a tension modulus to 200% equal to 55 kg./cm.² (ASTM D 412), an international hardness IRHD of 7 (ASTM D 1415), and a Mooney viscosity superior to 70 ML 1+4 at 212° F. (ASTM D 1646)].

These polymers are easily fabricated into flexible and transparent films by evaporation of a solution of the polymers. They present adhesive properties superior to those of the prior art polymers generally used for such purposes. In fact, comparative adhesive tests have been formed with 10% solutions of various polymers in a mixture of equal parts by volume of toluene and methyl-ethyl-ketone, in which the solvent has been evaporated before bringing the two surfaces into contact. After a minimum delay of 24 hours, the attempts at detachment were made with a dynamometer at a speed of 5 cm./minute.

The force was exerted parallel to the plane of adhesion in such a manner that the rupture would occur by shearing of the adhesive. The results of comparative tests, expressed in grams per cm.² of glued surface, are given in Table IV.

TABLE IV

| Glued surface | Polybutadiene prepared according to the present method | Cis-1,4-polybutadiene | Natural rubber |
|---|---|---|---|
| Copolymer-butadiene-styrene | 970 | 460 | 320 |
| A 42 steel | 1,150 | 940 | (¹) |
| Cardboard box | 5,950 | 1,900 | (¹) |

¹ Very weak.

Our polybutadiene has also better adhesive properties than neoprene with respect to copolymers butadiene-styrene, aluminum and A42 steel.

Furthermore, the polybutadienes prepared according to the present invention show excellent adhesion to glass. They are also characterized by better resistance to oxidation than the 1,4-poly-diolefins, which also favors their use as coating agents as well as adhesives. The following table shows the differences of resistances to ageing in a Geer oven at 70° C. in the presence of air (ASTM D 573).

|  | Polybutadiene prepared according to the present method | Cis-1,4 polybutadiene |
|---|---|---|
| 6 days: | | |
| Variation of resistance to rupture, percent | +5 | −10 |
| Variation of elongation to rupture, percent | −9 | −32 |
| Variation of hardness IRHD | +3 | +8 |
| 12 days: | | |
| Variation of resistance to rupture, percent | +5 | −22 |
| Variation of elongation to rupture, percent | −15 | −43 |
| Variation of hardness IRHD | +5 | +9 |

The aggregate of properties of the polybutadienes obtained by this process, namely, their elasticity, suppleness, resistance to oxidation, solubility and adhesiveness, makes it possible to use them advantageously for many purposes, for example, as an adhesive or as a coating agent.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:

1. A polymerization process for the production of polybutadiene having more than 90% 1,2-addition structure, said process comprising contacting 1,3-butadiene with a catalyst system comprising a mixture of a molybdenum compound selected from the group consisting of molybdenum halides and molybdenum oxyhalides and an aluminum compound having the formula $(RO)(R')_2Al$ wherein R and R' are monovalent hydrocarbon groups of about 1–20 carbon atoms, and the molar ratio of the aluminum compound to the molybdenum compound is greater than about 0.9.

2. The process of claim 1, wherein the groups R and R' are alkyl radicals containing 1 to 4 carbon atoms.

3. The process of claim 1, wherein the aluminum compound is monoethoxy-diethyl-aluminum.

4. The process of claim 1, wherein the molybdenum compound is molybdenum pentachloride.

5. The process of claim 1, wherein the molybdenum compound is molybdenum oxytrichloride.

6. The process of claim 1, wherein the molybdenum compound is the tetrachloride of molybdenum.

7. The process of claim 1, wherein the molar ratio of the aluminum compound to the molybdenum compound is between about 0.9 and 20.

8. The process of claim 1, wherein the molar ratio of the aluminum compound to the molybdenum compound is between about 1.5 and 3.

9. The process of claim 1, wherein the molar ratio of the molybdenum compound to the butadiene is greater than about 0.001.

10. The process of claim 1, wherein the molar ratio of the molybdenum compound to the butadiene is between about 0.0015 and 0.0075.

11. The process of claim 1, wherein the temperature is between about −25 and +75° C.

12. The process of claim 1, wherein in a first step about 1 to 20 moles of the butadiene per mole of the molybdenum compound is contacted with the catalyst system whereby a species of catalyst that is soluble in the hydrocarbons is preformed, and in a second step the major portion of the butadiene to be polymerized is then added to the catalyst solution.

13. A composition comprising a mixture of a molybdenum compound selected from the group consisting of molybdenum halides and molybdenum oxyhalides and an aluminum compound having the formula $(RO)(R')_2Al$ wherein R and R' are monovalent hydrocarbon groups of 1–20 carbon atoms and the molar ratio of the aluminum compound to the molybdenum compound is greater than about 0.9.

14. The composition of claim 13, further comprising about 1 to 20 moles of 1,3-butadiene per mole of the molybdenum compound.

15. The composition of claim 13, further comprising 1,3-butadiene wherein the molar ratio of the molybdenum compound to the butadiene is between about 0.0015 and 0.0075.

16. A process as defined by claim 1, wherein said monovalent hydrocarbon groups contain 1–4 carbon atoms.

17. A process as defined by claim 1, wherein said catalyst system consists essentially of said mixture.

18. A process as defined by claim 1, wherein said aluminum compound is selected from the group consisting of methoxy - dimethyl, methoxy - diethyl, ethoxy - dimethyl, ethoxy-diethyl, butoxy-diethyl, propoxy-dimethyl, ethoxy-diisobutyl, isobutoxy-diisobutyl, phenoxy-diisobutyl, benzyloxy-dicyclohexyl, cyclohexyloxy-methyl-ethyl, o-tolyl-oxy-phenyl-methyl, ethoxy-dibenzyl, isobutoxy-di(p.tolyl).

19. A process as defined by claim 18, wherein said molybdenum compound is selected from the group consisting of molybdenum pentachloride, molybdenum tetrachloride, molybdenum oxytrichloride, molybdenum tetrabromide, molybdenum oxytetrafluoride, and molybdenum dioxy-dibromide.

20. A composition as defined by claim 13, wherein said hydrocarbon groups contain 1–4 carbon atoms.

21. A composition as defined by claim 13, wherein said aluminum compound is selected from the group consisting of methoxy-dimethyl, methoxy-diethyl, ethoxy-dimethyl, ethoxy-diethyl, butoxy-diethyl, propoxy-dimethyl, ethoxy - diisobutyl, isobutoxy - diisobutyl, phenoxy-diisobutyl, benzyloxy - dicyclohexyl, cyclohexyloxy - methyl-ethyl, o-tolyloxy-phenyl-methyl-ethoxy-dibenzyl, isobutoxy-di(p.tolyl).

22. A composition as defined by claim 21, wherein said molybdenum compound is selected from the group consisting of molybdenum pentachloride, molybdenum tetrachloride, molybdenum oxytrichloride, molybdenum tetrabromide, molybdenum oxytetrafluoride, and molybdenum dioxy-dibromide.

References Cited

UNITED STATES PATENTS

| | | | |
|---|---|---|---|
| 3,038,863 | 6/1962 | Baithis et al. | 252—431 |
| 3,116,273 | 12/1963 | Naylor et al. | 260—94.3 |
| 3,336,280 | 9/1967 | Naylor | 260—94.3 |
| 3,232,920 | 2/1966 | Naylor | 260—94.3 |

JOSEPH L. SCHOFER, *Primary Examiner.*

R. A. GAITHER, *Assistant Examiner.*

U.S. Cl. X.R.

252—429

UNITED STATES PATENT OFFICE
CERTIFICATE OF CORRECTION

Patent No. 3,451,987  Dated June 24, 1969

Inventor(s) FRANCOIS DAWANS et al

It is certified that error appears in the above-identified patent and that said Letters Patent are hereby corrected as shown below:

Column 3, Line 3 of Table of Compounds, change

"isoC$_4$E$_9$O to ---isoC$_4$H$_9$O----

Column 3, Line 5 of Table of Compounds, change

"CE$_3$O" to ---CH$_3$O---

Column 3, Line 6 of Table of Compounds, change "C$_6$E$_{11}$O"

to ---C$_6$H$_{11}$O--- and "CHE$_3$" to---CH$_3$---

Column 3, Line 8 of Table of Compounds, change "CE$_3$"

to---CH$_3$---

SIGNED AND
SEALED
OCT 20 1970

(SEAL)
Attest:

Edward M. Fletcher, Jr.
Attesting Officer

WILLIAM E. SCHUYLER, JR.
Commissioner of Patents

FORM PO-1050 (10-69)